US 6,698,302 B2

United States Patent
Jäger et al.

(10) Patent No.: US 6,698,302 B2
(45) Date of Patent: Mar. 2, 2004

(54) METHOD OF KEEPING TRACK OF THE OPERATING POSITION OF AN ACTUATOR IN AN AUTOMATED GEAR-SHIFT TRANSMISSION

(75) Inventors: Thomas Jäger, Meckenbeuren (DE); Holger Stork, Bühl (DE); Martin Eckert, Achern (DE)

(73) Assignee: Luk Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/223,054

(22) Filed: Aug. 15, 2002

(65) Prior Publication Data

US 2003/0041683 A1 Mar. 6, 2003

Related U.S. Application Data

(63) Continuation of application No. PCT/DE01/00220, filed on Jan. 18, 2001.

(30) Foreign Application Priority Data

Feb. 15, 2000 (DE) .......................................... 100 06 540

(51) Int. Cl.$^7$ ................................................ F16H 61/12
(52) U.S. Cl. .......................................... 74/335; 701/62
(58) Field of Search ............................... 74/335, 336 R; 477/906; 701/62

(56) References Cited

U.S. PATENT DOCUMENTS 6,146,307 A * 11/2000 Takizawa et al. ............. 477/37

FOREIGN PATENT DOCUMENTS

JP 11-351378 * 12/1999

OTHER PUBLICATIONS

JP–11351378 A (NISSAN MOTOR) Dec. 24, 1999 (abstract) World Patents Index [online]. London, U.K.: Derwent Publications, Ltd. [retrieved on Jul. 11, 2003]. Retrieved from: EAST. DW200272, Accession No. 2000–119786.*

* cited by examiner

Primary Examiner—Ankur Parekh
(74) Attorney, Agent, or Firm—Darby & Darby

(57) ABSTRACT

A method of keeping track of the current operating position of an actuator in an automated gear-shift transmission has the following steps:

monitoring the level of energy supplied by an energy source to the actuator;

comparing the energy level to a minimum energy level required by the actuator; and if the energy level is lower than the required minimum, saving the current actuator position in memory for retrieval at a later time.

8 Claims, 1 Drawing Sheet

METHOD OF KEEPING TRACK OF THE OPERATING POSITION OF AN ACTUATOR IN AN AUTOMATED GEAR-SHIFT TRANSMISSION

This is a continuation of international application Serial No. PCT/DE01/00220, filed Jan. 18, 2001, the entire disclosure of which is hereby incorporated by reference.

BACKGROUND OF THE INVENTION

The invention relates to a method of keeping track of the operating position of an actuator in an automated gear-shift transmission. Directed by a transmission control unit and working through a transfer mechanism connecting to internal shifter elements of the transmission, the actuator serves to select a gear stage that is to be engaged and/or to perform the engagement of the gear stage.

The invention also relates to a transmission control unit that is equipped with appropriate devices to perform the aforementioned inventive method.

Gear-shift transmissions for motor vehicles are known in many ways. In the past, the term "gear-shift transmission" was primarily understood to mean a manually shiftable transmission which the driver of the vehicle would shift by hand through a shift lever. The shift movement in this kind of transmission is performed in a shift pattern—a so-called shift gate—where the shift lever is first moved in a selector track to an intersection with an engagement track, whereupon the transmission is shifted into the new gear by pushing the shift lever into the selected engagement track.

In addition to manual transmissions of the kind that has just been described, the known state of the art also includes automated gear-shift transmissions in which actuators are coupled to the transmission to perform the movement along a selector track and then shift the transmission into gear by moving to the end of an engagement track. In an automated gear-shift transmission, the phases of selecting and engaging a gear are performed, e.g., through actuators under the control of a program. The actuators are connected through a transfer mechanism to internal shifter elements of the transmission such as for example a central shifter shaft and shifting rods.

In an automated gear-shift transmission, the process of selecting, engaging and disengaging the individual gear stages runs under the control of a program, which requires the actual operating position of the individual actuators, such as electric motors or hydraulic cylinders, to be known, because the positions of the shifter elements inside the transmission are tied directly to the operating positions of the actuators. It can therefore not be allowed to happen that the operating position of individual actuators becomes unavailable, e.g., because of a temporary failure in the electrical system of the vehicle.

OBJECT OF THE INVENTION

The present invention therefore has the object of proposing a method of keeping the actual operating positions of the actuators continuously available for use by the program that controls the movements of the actuators.

SUMMARY OF THE INVENTION

The method according to the invention is designed to keep track of the operating position of an actuator in an automated gear-shift transmission. Directed by a transmission control unit and working through a transfer mechanism connecting to internal shifter elements of the transmission, the actuator serves to select a gear stage that is to be engaged and/or to move the selected gear stage into engagement. Under the inventive method, the energy source that powers the actuator is monitored, and if the energy level is found to be inadequate, the actuator position is stored so that it can be retrieved on demand.

In addition, the invention also proposes a transmission control unit that is appropriately equipped to perform the aforementioned inventive method.

According to the inventive method, a decrease in the energy level is detected at an early stage by monitoring the energy source of the actuator such as for example the system voltage of the vehicle, and by determining and storing the actual positions of the actuators, so that they can be retrieved at a later time when the energy level has come back to an adequate level. Thus, a time-consuming set-up process to establish a reference position of the actuator is made unnecessary.

According to an advantageous embodiment of the inventive method, the actuator position is stored by the transmission control unit. As a storage medium, one could use for an example an EEPROM (Electronically Erasable Programmable Read-Only Memory) in the transmission control unit, so that the actual positions of an actuator for the selecting movement and an actuator for the gear-engaging movement remain available after a complete breakdown of the system voltage of the vehicle. The method can be executed by the transmission control unit through a step of monitoring the system voltage of the vehicle and a step of determining and storing the actual actuator positions if the system voltage is found to have fallen to a predetermined threshold level.

The foregoing concept is advantageous for example, if the actuator is an electric motor using an incremental principle for measuring actuator displacement. The operating voltage of the motor is monitored and, if it falls below a predetermined threshold value, stored in the transmission control device.

The actual position that was registered and stored cannot be allowed to change after it has been saved in memory. A further developed version of the invention therefore includes the concept that the energy supply to the actuator is interrupted after detecting an energy level that is inadequate for powering the actuator. This feature of the inventive method is used advantageously, if the energy level is found to be declining gradually, indicating that within a short time the energy level will be insufficient to drive the actuators.

In a further embodiment of the method for keeping track of an actuator position in an automated gear-shift transmission, the actuator is likewise directed by a transmission control unit and works through a transfer mechanism connected to internal shifter elements of the transmission to select a gear stage that is to be engaged and/or to perform the engagement of the gear stage. The transmission control unit monitors the actual position of the actuator and can under certain conditions store the actual actuator position in memory. In the latter case, the transmission control unit will interrupt the energy supply to the actuator after the actuator position has been saved in memory.

The preceding embodiment of the method is used advantageously if the decline in the energy level occurs intentionally, for example when the electric system is deactivated for servicing the vehicle, e.g., by disconnecting the battery.

In the latter case, where the decline of the energy level is not gradual but occurs abruptly, it is advantageous to connect the transmission control unit to a diagnostic device that instructs the transmission control unit to store the actual operating position and to interrupt the energy supply.

After the actual positions of the actuators have been stored in memory, the supply voltage for the actuators and the transmission control unit can be interrupted. After the electric system of the vehicle has been reactivated, the transmission control unit can, for example, after detecting that the supply voltage has returned to an adequate level, automatically retrieve the actual positions that existed before the interruption of the electric supply and were saved, e.g., in an EEPROM. Alternatively, the retrieval of the saved actual position values could also be performed in response to an appropriate instruction from the diagnostic device to the transmission control unit.

The invention also provides a transmission control unit equipped with one or more devices for keeping track of the operating position of an actuator in an automated gear-shift transmission. The actuator is connected to the transmission control unit and works through a transfer mechanism acting on internal shifter elements of the transmission to select a gear stage that is to be engaged and/or to perform the engagement of the gear stage. The inventive transmission control unit monitors the energy source that powers the actuator and, if the energy level is found to be inadequate, the actuator position is stored so that it can be retrieved on demand.

For example, the transmission control unit can be equipped with a voltage sensor to monitor the voltage of the onboard electrical system of the vehicle, one or more incremental position-measuring devices to detect the actual positions of the actuators, and a memory device for saving the actuator positions, if the system voltage is found to be insufficient to power the actuators.

Monitoring of the onboard system voltage allows the detection of an imminent loss of electrical power before the voltage has become too low for a continued operation of the transmission control unit. The actual positions of the actuators are saved in memory in the transmission control unit before the onboard system voltage has become too low for the transmission control unit to continue working. To store the position data, the transmission control unit can be equipped with a non-volatile data-storage device, for example in the form of an EEPROM.

When the vehicle is serviced at a repair shop and the onboard electric power supply is interrupted, the actual position data of actuators using an incremental principle of position measurement can be safeguarded by issuing an instruction from a diagnostic instrument to the transmission control unit to save the actual position data in memory and to subsequently interrupt the supply or stop the supply of energy to the actuators, so that the actuators are immobilized in the positions that were saved in memory. After the onboard supply voltage has been restored, the saved position data are retrieved from memory, and the operation of the actuators can be resumed.

The novel features that are considered as characteristic of the invention are set forth in particular in the appended claims. However, the inventive method and transmission control unit themselves will be best understood from the following detailed description of a presently preferred specific embodiment with reference to the accompanying drawing.

BRIEF DESCRIPTION OF THE DRAWING

The detailed description of a preferred embodiment which follows below is based on the attached drawing. The features illustrated and described are intended as examples only and not to be interpreted as limitations on the scope of the invention.

DETAILED DESCRIPTION OF PREFERRED EMBODIMENTS

Figure 1:
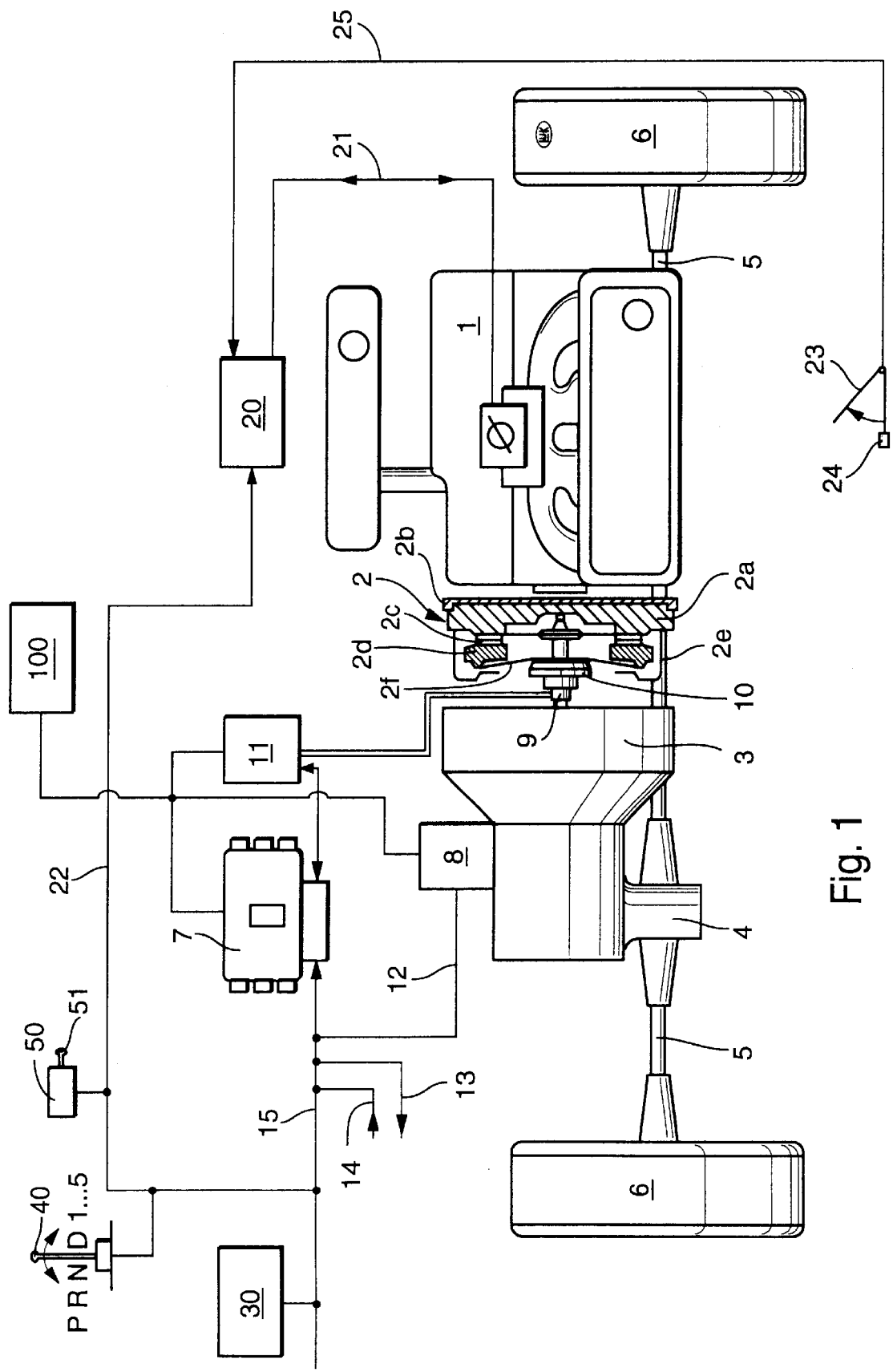
FIG. 1 represents a schematic view of a motor vehicle equipped with a control device according to the invention, operable to perform the method according to the invention.

FIG. 1 schematically illustrates a motor vehicle with a drive train containing an engine 1, a clutch 2, and a transmission 3. Also shown are a differential 4 and driving shafts 5 driving the driven wheels 6. RPM-sensors (not shown in the drawing) can be arranged at the wheels to detect the wheel rpm-rates. The wheel rpm-sensors serve to determine or calculate the input rpm-rate of the transmission. In case of a sensor error or a failure to deliver rpm-signals, the control unit can switch to an emergency mode of operation. The normal mode of operation is characterized by all signals being available and normal. The rpm-sensors can also be functionally related to other electronic units such as, e.g., an anti-lock braking system (ABS). Based on at least one wheel rpm-rate, a control unit 7 can determine at least a vehicle speed and/or a transmission rpm-rate. The engine 1 can also be configured as a hybrid drive source, e.g., with an electric motor, a flywheel with a free-wheeling clutch, and a combustion engine. The clutch 2 can be a friction clutch, but examples of possible clutches also include a magnet-powder clutch, a multi-disc clutch, a torque converter with a converter bypass clutch, or some other type of clutch. As a friction clutch, the clutch 2 can also be a wear-compensating self-adjusting clutch.

The device for the automated actuation of the transmission 3 includes a control unit 7 and an actuator 8 that works under the direction of the control unit 7. The control unit 7 can also provide control signals to a clutch actuator 11 to manage the automated actuation of the clutch 2. The control unit 7 can be configured as an integrated control unit that performs the control or regulation of, e.g., the clutch and the transmission. Furthermore, an electronic module for the engine can also be integrated in the control unit. However, the control of the clutch and the transmission through the actuators 8, 11 can also be performed by separate actuator units. The control units of the clutch, the transmission, and/or the engine could also be arranged in separate locations and communicate with each other through data- and/or signal lines. Furthermore, the control units have signal connections to sensors delivering signals or data that characterize the current operating state. It is also possible that the control unit is supplied with all of the required information through data lines or a data bus such as, e.g., a CAN-Bus (Central Area Network Bus).

The control unit 7 is equipped with a computer unit to receive, process, store, retrieve and forward incoming signals and systems information. The control unit also generates control quantities and/or control signals that are sent directly to actuators or forwarded to other electronic units.

The clutch 2 is mounted on or connected to a flywheel 2a. The flywheel can be configured as an integral, single-mass flywheel or as a divided flywheel with a primary mass and a secondary mass. In a divided flywheel, a damper device can be arranged to attenuate rotary oscillations. Furthermore, the flywheel can carry a starter ring gear 2b. The clutch has a clutch disc 2c with friction linings, a pressure plate 2d, a clutch cover 2e, and a diaphragm spring 2f. If the clutch is self-adjusting, it is additionally equipped with self-adjusting means for wear-compensation. The self-adjusting means includes a force sensor or a sensor for linear or angular displacements to detect a condition where the clutch needs adjusting because of wear, and to automatically perform the adjustment when necessary.

The clutch is actuated by a release device 9, e.g., with a release bearing 10. The control unit 7 directs the actuator 11 which, in turn, actuates the clutch. The release device can be actuated through an electric motor, through a combination of an electric motor with hydraulic elements, actuated through a pressure medium, or by some other actuating mechanism. The release device 9 with the release bearing 10 can be configured as a concentric slave cylinder that is coaxial to the transmission input shaft and acts, e.g., against the tongues of the clutch diaphragm spring to engage and disengage the clutch. However, the release device can also be a mechanical device acting on a release bearing or a comparable element.

The actuator 8 has one or more output- or actuating elements to actuate the selecting and engaging movements of the transmission 3. The way in which the selecting and engaging movements are controlled depends on the type of transmission.

Of particular interest in the present context is the type of transmission in which the gear-selecting movement is performed by a rotary actuation of a central shifter shaft, and the gear-engaging movement by a linear actuation, or vice versa. For example, an actuator may effect an axial movement of the shifter shaft through a first actuating element, and a rotary movement through a second actuating element. As mentioned, the engaging movement can be performed through a rotation, and the selecting movement through an axial position change of the shifter shaft, or vice versa.

Also of interest in connection with the present invention are transmissions with two actuating shafts, where one of the shafts serves to select a gear, and the other shaft serves to move the selected gear stage into engagement, with both shafts being configured for rotary actuation.

Further of interest are transmission with shifting rods that are actuated in their axial direction to move a selected gear stage into engagement. The selecting operation is in this case performed by selecting the rod to be actuated.

The shifter shafts or shifting rods themselves represent internal shifter elements of the transmission, or they are arranged to act on internal shifter elements. Thus, the actuator 8 acts either directly or indirectly on internal shifter elements to actuate the engagement, disengagement, or change of transmission levels.

The control unit 7 is connected through a signal line 12 to the actuator 8, so that control commands and/or sensor signals or operating-state-related signals can be exchanged, forwarded, or called up. Further, signal lines 13 and 14 are available, through which the control unit is in signal communication with other sensors or electronic units at least part of the time. Such other electronic units may include, e.g., an electronic engine control device, an anti-lock brake control device, or an electronic anti-slippage regulation device. Other sensors may be provided to characterize or detect the operating state of the vehicle in general, such as rpm-sensors for the engine or the wheels, throttle position sensors, gas pedal position sensors, or other sensors. The signal line 15 represents a connection to a data bus such as a CAN bus, through which system data of the vehicle or of other electronic units are made available, as the electronic units are normally networked through computer units.

An automated gear-shift transmission can be shifted from one transmission ratio to another in a driver-initiated mode, e.g., by giving a command to shift up or down one level by means of a switch, a touch key, or another gear-selecting device 40. Another possibility is a selector device to set the next gear to be engaged. Such a selector device could be configured as an electronic shift lever.

Under a different transmission control program, an automated mode for actuating the transmission may be selected, so that the gear level to be used is selected on the basis of operating parameters and a gear-shifting process is initiated automatically when necessary. An automated transmission can automatically change gears at certain predetermined points by using characteristic values, functions or data arrays, without the need for driver intervention.

The transmission can further be set into a neutral position in which there is no torque-transmitting connection between the input side and the output side of the transmission. It is also possible to select a parking position where the transmission is immobilized in a locked condition for parking. The selection of the parking position can also occur automatically, e.g., when the ignition key is pulled out of the ignition lock, unless the vehicle is in an incompatible state of motion. For example, the parking lock should not be automatically engaged if the ignition key is pulled out while the vehicle is traveling at high speed.

To summarize, the selector element such as a shift lever or selector lever 40 can be set to a shifting range M for manual gear selection by the driver, a position D for automatic gear selection, a parking-lock position P, or a neutral position N. It is further possible to initiate manual gear shifts, e.g., through switches or through a lever. In the case of an automated clutch with a manually shiftable transmission, the shift lever has to be set manually into the positions that are assigned to the different gears.

The vehicle is preferably equipped with an electronic gas pedal 23 or another appropriate control element. The electronic gas pedal 23 acts on a sensor 24. Based on the sensor signal, the electronic engine control unit 20 regulates one or more operating variables of the engine, such as the rate of fuel supply, ignition timing, fuel-injection timing, or throttle position. The electronic gas pedal 23 with the sensor 24 is connected through the signal line 25 to the electronic engine control unit 20. The latter is connected to the control unit 7 through a signal line 22. Furthermore, an electronic transmission control unit 30 can be connected to exchange signals with the control unit 7 and 20. In connection with the electronic control units, it is practical to use an electric motor to actuate the throttle under the control of the electronic engine control unit. In systems of this kind, it is no longer necessary nor practical to have a direct mechanical connection to the gas pedal.

The vehicle is further equipped with an engine-starter device 50. When the driver operates an engine-start control element such as an ignition key 51 in the ignition lock, the engine-starter device 50 activates the electronic engine control unit and a starter motor to start the engine.

The control unit of the automated clutch or the automated transmission is equipped with a signal processor as well as a memory in which data can be saved and subsequently retrieved.

FIG. 1 further shows a battery for the electric supply of the control unit 7 and/or the actuators 8, 11 of the clutch 2 and transmission 3. Thus, the storage battery 100 represents the energy source which powers the actuator and which is monitored,by the control unit 7 according to the inventive method. If at any point the energy level is found to be insufficient to keep the actuator operating, the current actuator position is saved in the memory device of the control unit so that it can later be retrieved. The monitoring can take place inside the control unit, since the control unit itself is likewise connected to the battery.

Without further analysis, the foregoing will so fully reveal the essence of the present invention that others can, by applying current knowledge, readily adapt it for various applications without omitting features that, from the standpoint of prior art, fairly constitute essential characteristics of the generic and specific aspects of our present contribution to the art. Therefore, any such adaptation is meant to be included within the meaning and range of equivalence of the appended claims.

What is claimed is:

1. A method of keeping track of a current operating position of an actuator in an automated gear-shift transmission, wherein the actuator receives energy from an energy source and command signals from a transmission control unit, and wherein the actuator imparts motion through a transfer mechanism to internal shifter elements of the transmission to perform at least one of selecting a gear stage that is to be engaged and of moving said gear stage into engagement, the method comprising the steps of:

monitoring an energy level supplied by the energy source;

comparing the energy level to a minimum energy level required by the actuator; and if the energy level is lower than said minimum energy level, determining a current operating position of the actuator and saving said current operating position in memory to be retrievable at a later time.

2. The method of claim 1, wherein the step of determining and saving the current operating position is performed by the transmission control unit.

3. The method of claim 1, wherein the actuator comprises an electric motor operable to perform an incremental position measurement, wherein the monitoring of the energy level is carried out by monitoring an operating voltage of the electric motor, the minimum energy level is represented by a minimum voltage, and wherein the step of determining and saving the current operating position is performed if the operating voltage is lower than the minimum voltage.

4. The method of claim 1, further comprising the step of:

if the energy level is lower than said minimum energy level, interrupting the energy supplied by the energy source to the actuator.

5. The method of claim 1, further comprising the steps of:

by means of the transmission control unit, monitoring a current operating position of the actuator; and interrupting the energy to the actuator, wherein the step of saving the current operating position in memory is performed prior to the step of interrupting the energy to the actuator.

6. The method of claim 5, further comprising the step of connecting the transmission control unit to a diagnostic instrument, wherein the diagnostic instrument issues command signals to the transmission control unit for the step of saving the current operating position and interrupting the energy to the actuator.

7. The method of claim 1, wherein the transmission control unit is powered by a control unit supply voltage, and wherein the method further comprises the steps of:

monitoring the control unit supply voltage;

comparing the control unit supply voltage to a minimum voltage level required by the transmission control unit; and if the control unit supply voltage is lower than said minimum voltage level, determining a current operating position of the actuator and saving said current operating position in memory to be retrievable at a later time.

8. A transmission control unit comprising:

a means for monitoring a level of energy supplied by an energy source to a transmission actuator;

a means for comparing the energy level to a minimum energy level required by the transmission actuator, and for generating a signal if the energy level is lower than the minimum energy level;

a means for determining a current operating position of the actuator; and a memory device in which to retrievably store said current operating position if said signal is present.

* * * * *